United States Patent
Suzuki et al.

(10) Patent No.: US 7,468,868 B2
(45) Date of Patent: Dec. 23, 2008

(54) ROTARY DISK STORAGE DEVICE

(75) Inventors: Takao Suzuki, Kanagawa (JP); Kohichi Takeuchi, Kanagawa (JP); Naoaki Kanada, Kanagawa (JP); Ichiro Koyanagi, Kanagawa (JP)

(73) Assignee: Hitachi Global Storage Technologies Netherlands B.V., AZ Amsterdam (NL)

( * ) Notice: Subject to any disclaimer, the term of this patent is extended or adjusted under 35 U.S.C. 154(b) by 426 days.

(21) Appl. No.: 10/821,483

(22) Filed: Apr. 9, 2004

(65) Prior Publication Data

US 2004/0240120 A1 Dec. 2, 2004

(30) Foreign Application Priority Data

May 30, 2003 (JP) ............................ 2003-155284

(51) Int. Cl.
*G11B 5/55* (2006.01)
(52) U.S. Cl. .................................. 360/265.1
(58) Field of Classification Search ............. 360/265.1, 360/256.2, 256.3
See application file for complete search history.

(56) References Cited

U.S. PATENT DOCUMENTS

| 5,448,435 | A | * | 9/1995 | Nakazawa et al. | 360/256.3 |
| 5,483,399 | A | * | 1/1996 | Jeong et al. | 360/256.2 |
| 5,729,405 | A | * | 3/1998 | Isomura et al. | 360/256.2 |
| 5,864,449 | A | * | 1/1999 | Dominguez et al. | 360/265.1 |
| 6,115,222 | A | * | 9/2000 | Andrews et al. | 360/265.1 |
| 6,459,550 | B1 | * | 10/2002 | Gillis et al. | 360/265.1 |
| 6,567,242 | B2 | * | 5/2003 | Misso et al. | 360/265.1 |
| 6,954,338 | B2 | * | 10/2005 | Muraki et al. | 360/265.1 |
| 2003/0090841 | A1 | * | 5/2003 | Muraki et al. | 360/265.1 |

FOREIGN PATENT DOCUMENTS

JP 04-109466 A 4/1992

(Continued)

OTHER PUBLICATIONS

Japan Patent Office (JPO) office action dated Jul. 17, 2007 for JPO laid open patent application JP2003-155284.

(Continued)

*Primary Examiner*—Tianjie Chen
(74) *Attorney, Agent, or Firm*—Townsend and Townsend and Crew LLP; Rambod Nader

(57) ABSTRACT

A rebounding phenomenon of an actuator assembly is to be prevented and device assembling work and maintenance work are to be carried out separately from stopper removing work. In one embodiment, a magnetic disk device includes a stopper 50 for restricting a turning range of an actuator assembly 8 having a coil support 22 in a magnetic disk device. In the stopper 50, rubber 51 is cantilevered by a support rod 261 so as to undergo a moment of force and fulfill a shock absorbing function in order to restrict an excessive movement of the actuator assembly 8 to an inner or an outer side when the rubber 51 is abutted against a first arm 22a or a second arm 22b of a bifurcated shape of the coil support 22, the support rod 261 is disposed outside a turning track of turning ends of the first and second arms 22a, 22b of the coil support 22, and a permanent magnet 52 is embedded in the rubber 51 to attract the first and second arms 22a, 22b.

14 Claims, 8 Drawing Sheets

FOREIGN PATENT DOCUMENTS

| | | |
|---|---|---|
| JP | 04-149870 A | 5/1992 |
| JP | 2002-025207 A | 1/2002 |
| JP | 2003-151226 A | 5/2003 |
| JP | 2003151226 A * | 5/2003 |

OTHER PUBLICATIONS

State Intellectual Property Office of China (SIPO) office action dated Jan. 18, 2008 for SIPO patent application CN2004-10043139.0.

* cited by examiner

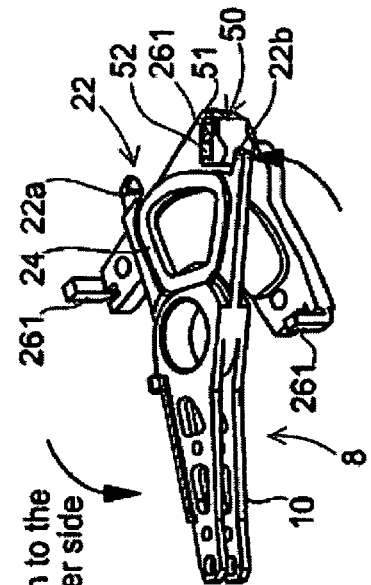
FIG. 1(a)
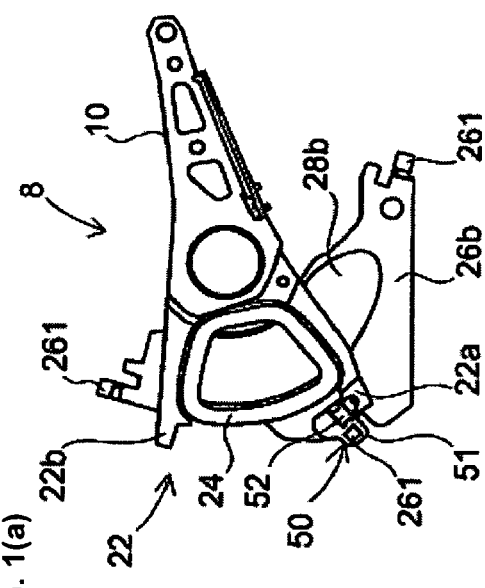
FIG. 1(b)
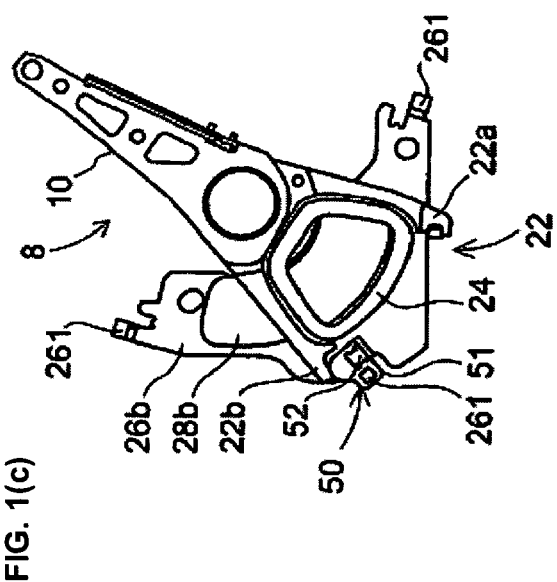
FIG. 1(c)
FIG. 1(d)

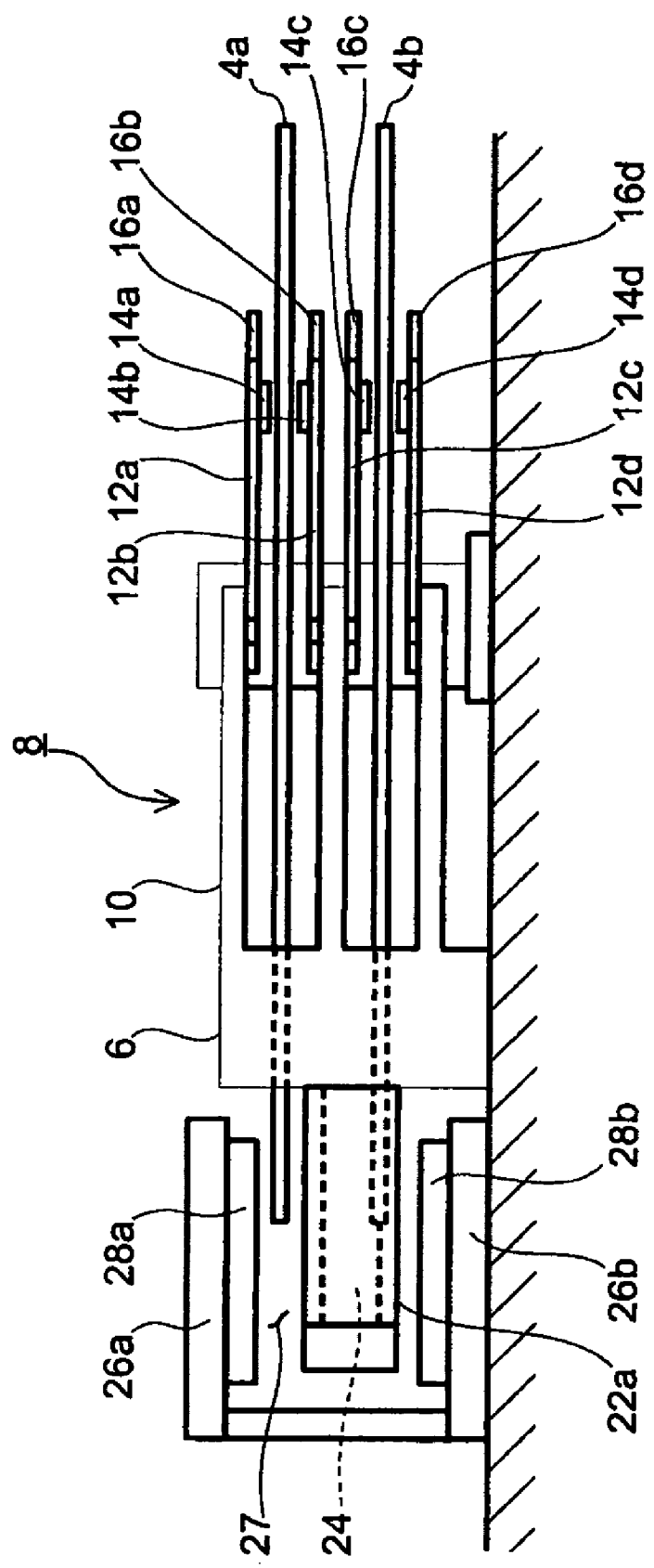

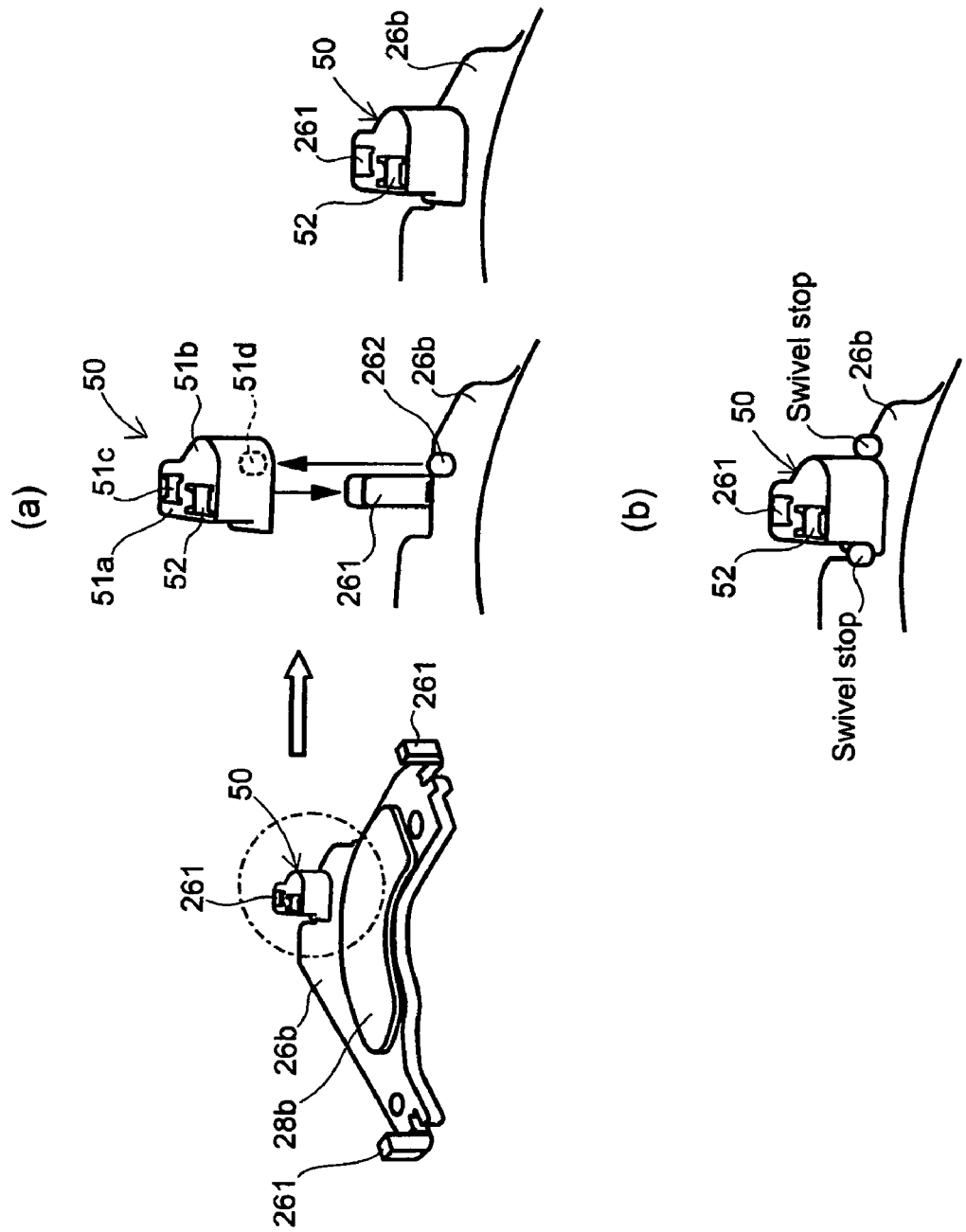

FIG.7
(a)
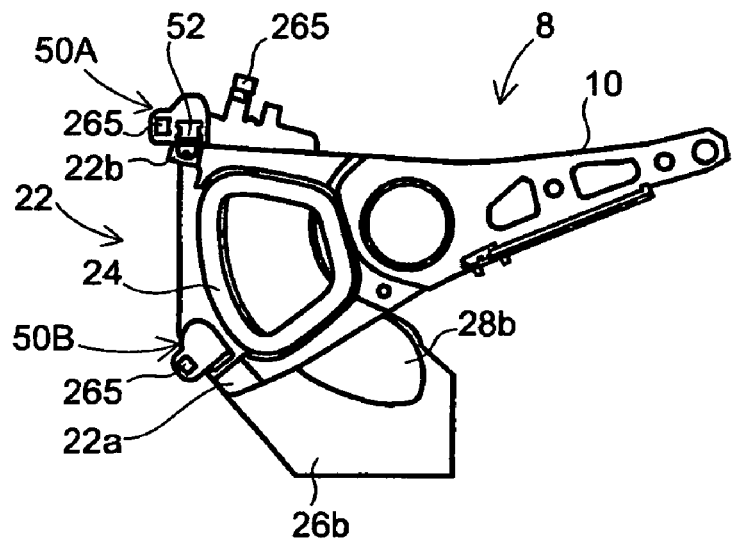
(b)
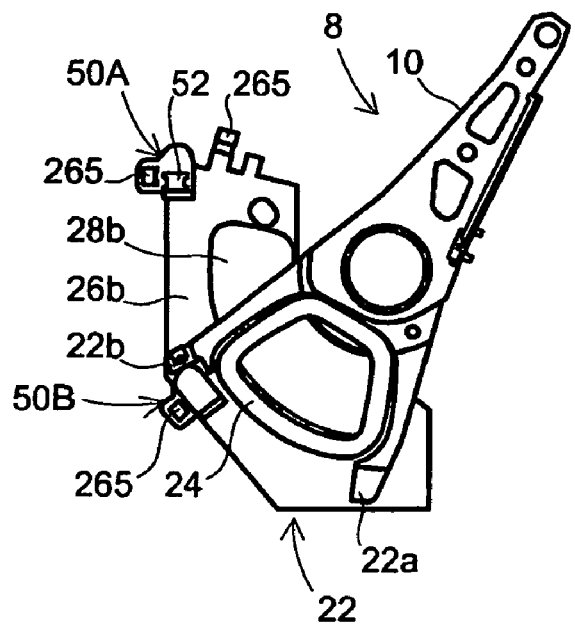

ROTARY DISK STORAGE DEVICE

BACKGROUND OF THE INVENTION

The present invention relates to rotary disk storage devices such as magnetic disk devices or a magneto-optic disk devices. In particular, the invention relates to a rotary disk storage device having a stopper which comes into abutment against an actuator assembly to restrict an excessive movement, of the actuator assembly, to an inner or an outer side.

A magnetic disk device as a rotary disk storage device includes a rotary magnetic disk having a magnetic layer formed on a surface thereof and being adapted to rotate about a spindle shaft, a suspension assembly, an actuator assembly, and a control unit for controlling read and write of data and the operation of the actuator assembly.

A slider is attached to the suspension assembly. The slider, to which a magnetic head for read and write of data is attached, provides an air bearing surface (ABS). The actuator assembly includes a carriage arm to which the suspension assembly is connected and which is adapted to turn about a pivot shaft.

A coil arm is formed in part of the carriage arm and holds a voice coil. The coil arm is disposed within a magnetic field of a voice coil magnet. The voice coil magnet and the voice coil constitute a voice coil motor (VCM) which generates a driving force for rotating the carriage arm.

As the magnetic disk rotates, an air current on its surface forms an air bearing, imparting buoyancy to the air bearing surface of the slider and lifting the slider slightly from the magnetic disk surface. The slider turns about a pivot shaft in a state of floating slightly from the magnetic disk surface by the driving force of the voice coil motor, thereby permitting the magnetic head to read and write data in a predetermined position of the disk surface.

With a view to preventing the magnetic disk from becoming unable to turn due to mutual sticking of the magnetic head and the magnetic disk and preventing the resultant damage of the disk and the head, the disk devices adopt a CSS (Contact Start Stop) method and a load/unload method. The CSS method ensures that the magnetic disk surface is made uneven in only a specific area and the magnetic head is retracted to the specific area when the rotation of the disk is stopped. The load/unload method provides a ramp for isolating the magnetic head from the magnetic disk when the rotation of the disk is stopped.

Such disk devices are provided with a stopper for restricting a turning range of the actuator assembly. The stopper comes into abutment against a crash point of the coil arm to restrict the above turning range. When it has become impossible to read a track in magnetic signal recording or reproducing operation, it is necessary to move the magnetic head rapidly to the ramp position (in the load/unload method) or to the position of the specific area (in the CSS method) of the magnetic disk, or when the power supply is interrupted suddenly, it is necessary that the magnetic head be moved to the ramp position (in the load/unload method) or to the position of the specific area (in the CSS method) of the magnetic disk by utilizing a counter electromotive force of the disk. In order to prevent rebounding of the actuator assembly under a collision shock of the coil arm, the stopper is required to be elastic enough to absorb the shock. At the time of writing a servo pattern as track positioning information onto the magnetic disk, the stopper is also required to function as a reference for determining a write position and is therefore required to have a certain degree of rigidity.

In connection with such a stopper there is known, for example, a disk device (see, for example, Japanese Patent Laid-open No. 9-55047) wherein an inner stopper adapted to define an innermost periphery to which a slider with a magnetic head attached thereto is movable on a magnetic disk surface, and an outer stopper adapted to define an outermost periphery to which the slider is movable, are provided at both end portions of a turning range of a coil arm.

In the disk device disclosed in the above-referenced patent, the inner stopper and the outer stopper are each composed of a shaft fixed to a base of the disk device with an annular groove formed on an outer periphery surface thereof, and a cylindrical shock-absorbing rubber mounted on the shaft so as to cover the annular groove. In such inner and outer stoppers, even if there is used a shock-absorbing rubber having a high hardness, the cylindrical shock-absorbing rubber deflects while getting into the annular groove and therefore can absorb the shock of the actuator assembly.

As the stopper used in the magnetic disk device there also is known a stopper constituted by only an elastic member such as rubber. In this stopper, the shock of the actuator assembly is absorbed by only the elastic function of the elastic member.

However, in the disk device disclosed in the above-referenced patent, a stopper shaft is disposed on the track of a crash point of the coil arm, so in assembling an actuator and at the time of installing the magnetic disk in a housing, mounting a lower yoke, and further mounting the actuator and an upper yoke as an integral combination to the housing, it is necessary to turn the actuator up to a position beyond a fixed position of the outer stopper so as not to overlap the magnetic disk in a planar position, or else it will become difficult to effect assembling of the actuator. Besides, the actuator and the magnetic disk are overlapped at the fixed position of the outer stopper in a planer manner. Therefore, even if the cylindrical shock-absorbing rubber is removed from the shaft, the assembling of the actuator may become difficult as long as there is such an actuator-disk overlapped condition. Even in the case where the overlapped condition is eliminated by removing the cylindrical shock-absorbing rubber from the shaft, since both inner and outer stoppers are installed between the lower yoke and the upper yoke, it is necessary to assemble the lower yoke, actuator, cylindrical shock-absorbing rubber, and upper yoke in this order, resulting in the complicated assembling-work. Further, since the cylindrical shock-absorbing rubber is formed thin enough to get into the annular groove and deflect, a magnetic member such as a permanent magnet which can attract the coil arm has so far been unable to be embedded in the cylindrical shock-absorbing rubber.

On the other hand, in the case of a stopper constituted by an elastic member alone, the stopper can be provided only in an operation angle range of the coil arm of the actuator assembly. Besides, since a magnet is embedded in the elastic member, the volume of the elastic member is limited and it has heretofore been impossible to let the elasticity of the elastic member be exhibited efficiently. If a pin or the like is disposed nearly centrally of the elastic member for fixing the stopper in question, the volume of the elastic member decreases and here again it has so far been impossible to let the elasticity be exhibited efficiently.

Moreover, the stopper constituted by an elastic member alone is poor in mounting stability and involves the drawback that its portion of abutment against the coil arm is displaced and causes a change in the turning range of the actuator assembly. Further, since this stopper has a dislodgment preventing pawl in its inserting portion, is directly inserted into a hole and is established its position, the inserting resistance becomes large, causing a working drawback such that the use of a lubricant is essential for smooth insertion. Additionally, this positioning cannot be done accurately and a start point of data write becomes uncertain.

BRIEF SUMMARY OF THE INVENTION

To overcome the above-mentioned drawbacks of the prior art, it is a feature of the invention to provide a rotary disk storage device capable of absorbing a shock of the actuator assembly, also capable of effecting positioning accurately, and facilitating the mounting/dismounting work and maintenance work.

In accordance with a first aspect of the present invention, a rotary disk storage device comprises a housing, a rotary disk recording medium, the rotary disk recording medium having a data area and being rotatable about a spindle shaft supported by a bottom of the housing, a slider to which a head is attached to read data from the rotary disk recording medium, a suspension assembly to which the slider is attached, and an actuator assembly to which the suspension assembly is attached, the actuator assembly being adapted to turn about a pivot shaft so that the head moves between the data area and a retraction area, the pivot shaft being supported by the bottom of the housing, and a stopper including an elastic member, the elastic member being cantilevered by a support rod and with a magnetic material embedded therein for attracting the actuator assembly, wherein when any portion of the actuator assembly comes into abutment against the elastic member, the elastic member undergoes a moment of force so as to restrict an excessive movement of the actuator assembly to an inner or an outer side, and cushions the abutment.

According to the rotary disk storage device in the above first aspect, since the elastic member of the stopper is cantilevered by the support rod so as to undergo a moment of force and fulfill a shock-absorbing function, the elastic member can deflect and absorb a shock when the actuator assembly comes into abutment against the elastic member. Besides, such a structure of the elastic member permits a magnetic material to be embedded therein. Thus, the actuator assembly can be attracted by the magnetic material, so that it is possible to prevent the rebounding phenomenon of the actuator assembly.

In accordance with a second aspect of the present invention, a rotary disk storage device comprises a housing, a rotary disk recording medium, the rotary disk recording medium having a data area and being rotatable about a spindle shaft supported by a bottom of the housing, a slider to which a head is attached to read data from the rotary disk recording medium, a suspension assembly to which the slider is attached, and an actuator assembly to which the suspension assembly is attached, the actuator assembly being adapted to turn about a pivot shaft so that the head moves between the data area and a retraction area, the pivot shaft being supported by the bottom of the housing, and a stopper including an elastic member cantilevered by a support rod, wherein, when any portion of the actuator assembly comes into abutment against the elastic member, the elastic member undergoes a moment of force so as to restrict an excessive movement of the actuator assembly to an inner or an outer side, and cushions the abutment, and the support rod is disposed outside a turning track of a turning end of the actuator assembly.

According to the rotary disk storage device in the above second aspect, since the elastic member of the stopper is cantilevered by the support rod so as to undergo a moment of force and fulfill a shock-absorbing function, the elastic member can deflect and absorb a shock when the actuator assembly comes into abutment against the elastic member. Besides, since the support rod which cantilevers the elastic member is disposed outside a turning track of a turning end of the actuator assembly, a mere removal of the elastic member of the stopper from the support rod permits execution of the mounting/dismounting work for the actuator assembly, etc.

In the above first and second aspects, the rotary disk storage device is further provided with a ramp, and the actuator assembly causes the slider to be retracted to the ramp. According to this construction, the rotary disk recording medium can also be applied to the load/unload method wherein the head is isolated from the rotary disk recording medium when the rotation of the recording medium is stopped.

In the above first and second aspects, the retraction area is formed on the rotary disk recording medium, and the actuator assembly causes the slider to be retracted to the retraction area. This construction is also applicable to the CSS method wherein the head is retracted to the retraction area when the rotation of the rotary disk recording medium is stopped.

In the above first and second aspects, a coil support of the actuator assembly is formed in a bifurcated shape, and the stopper is disposed inside the bifurcated shape. According to this construction, in the load/unload method, an excessive movement of the actuator assembly to the inner or the outer side can be restricted by a single stopper.

In the above first and second aspects, the portion of either the outer or the inner side of the elastic member of the stopper, against which the actuator assembly turns into abutment, is formed in a shape having a shock absorbing property that prevents rebounding of the actuator assembly upon abutment, while the portion of the other outer or inner side of the elastic member, against which the actuator assembly turns into abutment, is formed in a shape having a shock absorbing property that permits the actuator assembly to stop substantially in the same position upon abutment. According to this construction, with a single stopper, even when the actuator assembly turns to either the outer or the inner side into abutment against the stopper, it does not rebound. Further, even when the actuator assembly turns to the other outer or inner side into abutment against the stopper, it can be stopped in the abutted position.

In the above first and second aspects, a coil support of the actuator assembly is bifurcated, and the stopper is disposed in one of two positions outside the bifurcated shape, while in the other position is disposed a stopper for restricting an excessive movement of the actuator assembly to the inner or the outer side. According to this construction, an excessive movement of the actuator assembly to the inner or the outer side can be restricted by the stoppers disposed in two positions outside the bifurcated shape.

In the above first and second aspects, a coil support of the actuator assembly is formed in a bifurcated shape, and the stopper is disposed on either the outer or the inner side of the bifurcated shape, while on the other side is disposed a stopper for restricting an excessive movement of the actuator assembly to the inner or the outer side. According to this construction, an excessive movement of the actuator assembly to the inner or the outer side can be restricted by the stoppers disposed respectively outside and inside the bifurcated shape.

In the above first and second aspects, the portion of either the outer or the inner side of the elastic member as one of the stoppers for restricting an excessive movement of the actuator assembly to the outer side, against which the actuator assembly turns into abutment, is formed in a shape having a shock absorbing property that prevents rebounding of the actuator assembly upon abutment, while the portion of the other outer or inner side of the elastic member of the other stopper for restricting an excessive movement of the actuator assembly to the inner side, against which the actuator assembly turns into abutment, is formed in a shape having a shock absorbing property that permits the actuator assembly to stop substantially in the same position upon the abutment. According to this construction, even when the actuator assembly turns to the outer side into abutment against one stopper, the stopper can absorb the abutment shock so as not to cause rebounding of the actuator assembly. Likewise, even when the actuator assembly turns to the inner side into abutment against the other stopper, the actuator assembly can be stopped in the abutted position by the other stopper.

In the above first and second aspects, the elastic member of the stopper, when fitted on the support rod, comes into pressure contact with the support rod. According to this construction, the insertion hole of the elastic member expands when the elastic member is fitted on the support rod, so that the fitting performance is improved and it is possible to prevent dislodgment of the elastic member.

In the above first and second aspects, the rotary disk storage device further comprises a lower yoke and an upper yoke, with a voice coil motor being installed inside the lower and upper yokes to rotate the actuator assembly, the lower and upper yokes imparting a rotational force to the voice coil motor by virtue of a magnetic field, and a rod projecting from the lower or the upper yoke is used as the support rod. According to this construction it is not necessary to separately provide a member for fixing the elastic member of the stopper.

In the above first and second aspects, the rotary disk storage device further comprises a swivel stop fitted in an insertion hole formed in the elastic member, the swivel stop being disposed in such a position as prevents rotation of the elastic member centered on a support point of the stopper. In a still further aspect of the present invention related to the above first and second aspects, the rotary disk storage device further comprises a swivel stop abutted against an outer surface of the elastic member, the swivel stop being disposed in such a position as prevents rotation of the elastic member centered on a support point of the stopper. According to this construction, when the actuator assembly comes into abutment against the elastic member, it is possible to prevent a change in turning range of the actuator assembly caused by rotation of the stopper and consequent dislocation of the abutted position.

In accordance with a third aspect of the present invention, a rotary disk storage device comprises a housing, a rotary disk recording medium, the rotary disk recording medium having a data area and being rotatable about a spindle shaft supported by a bottom of the housing, a slider to which a head is attached to read data from the rotary disk recording medium, a suspension assembly to which the slider is attached, and an actuator assembly to which the suspension assembly is attached, the actuator assembly being adapted to turn about a pivot shaft so that the head moves between the data area and a retraction area, the pivot shaft being supported by the bottom of the housing, and a stopper including an elastic member, the elastic member being cantilevered by a support rod with a magnetic material being embedded therein for attracting the actuator assembly, wherein when any portion of the actuator assembly comes into abutment against the elastic member, the elastic member undergoes a moment of force so as to restrict an excessive movement of the actuator assembly to an inner or an outer side, and cushions the abutment, and the support rod is disposed outside a turning track of a turning end of the actuator assembly.

In this third aspect, since the stopper is cantilevered by the support rod so that the elastic member undergoes a moment of force and fulfills a shock absorbing function, the stopper, upon abutment of the actuator assembly against it, can deflect and absorb the resulting shock. Besides, such a structure of the elastic member permits a magnetic material to be embedded therein, that is, the actuator assembly can be attracted by the magnetic material, so that it is possible to prevent the rebounding phenomenon of the actuator assembly. Further, since the support rod which cantilevers the elastic member is disposed outside a turning track of a turning end of the actuator assembly, a mere removal of the elastic member of the stopper from the support rod permits execution of the mounting/dismounting work for the actuator assembly, etc.

BRIEF DESCRIPTION OF THE DRAWINGS

FIG. 1(a) is a top view of a rotary disk storage device according to one embodiment of the present invention, in a first position. FIG. 1(b) is a perspective view of the embodiment in the same position as in FIG. 1(a). FIG. 1(c) is a top view of the same embodiment in a second position, and FIG. 1(d) is a perspective view of the embodiment in same position as in FIG. 1(c).

FIG. 3 is a schematic cross-sectional view taken on line A-A in FIGS. 2(a)-(b).

FIGS. 5(a)-(b) are explanatory diagrams showing a relation between a stopper and a lower yoke in the embodiment illustrated in FIGS. 1(a)-(d).

FIGS. 7(a)-(b) are partial detailed views of a rotary disk storage device according to a further embodiment of the present invention.

DETAILED DESCRIPTION OF THE INVENTION

Figure 2A:
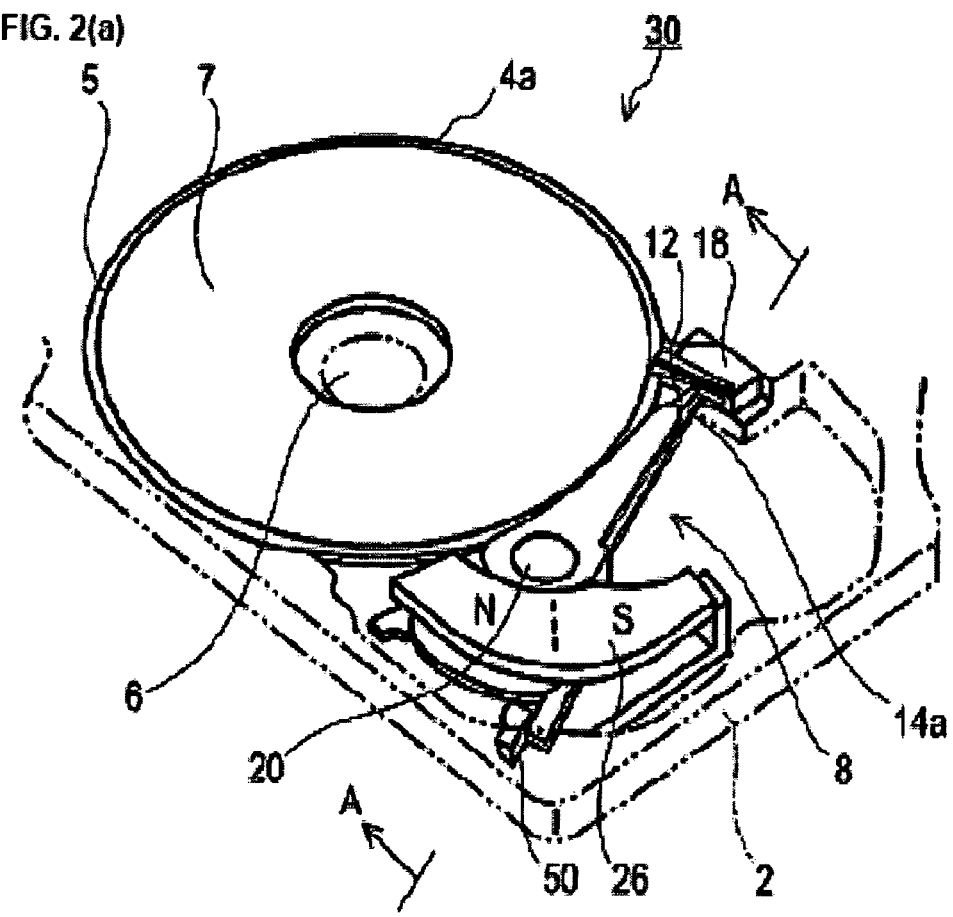
FIGS. 2(a)-(b) are perspective views from different directions showing a schematic construction of a magnetic disk device as the rotary disk storage device.
Figure 2B:
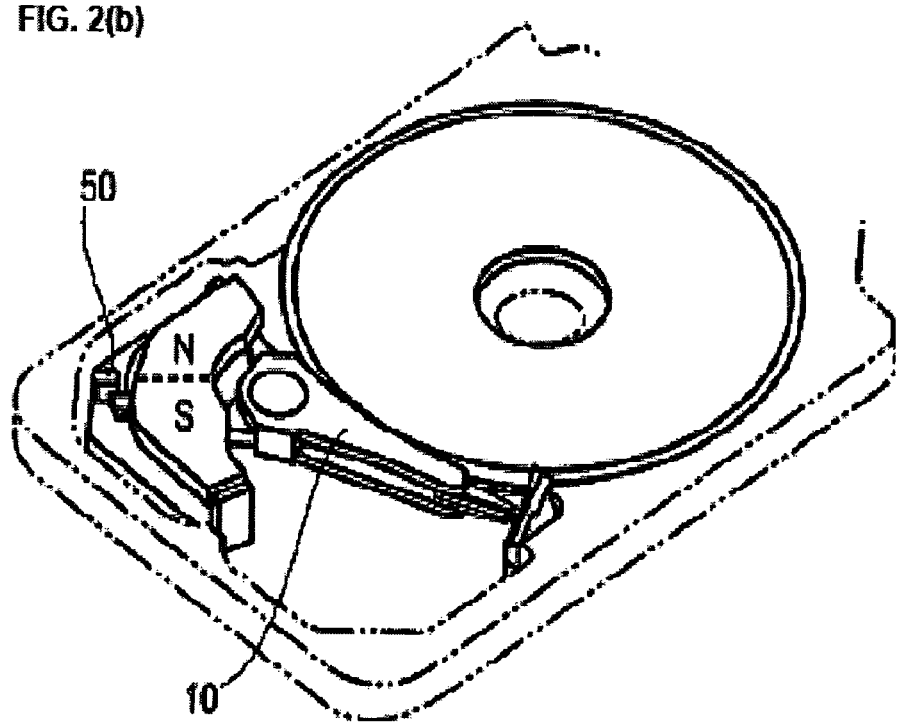
Figure 4:
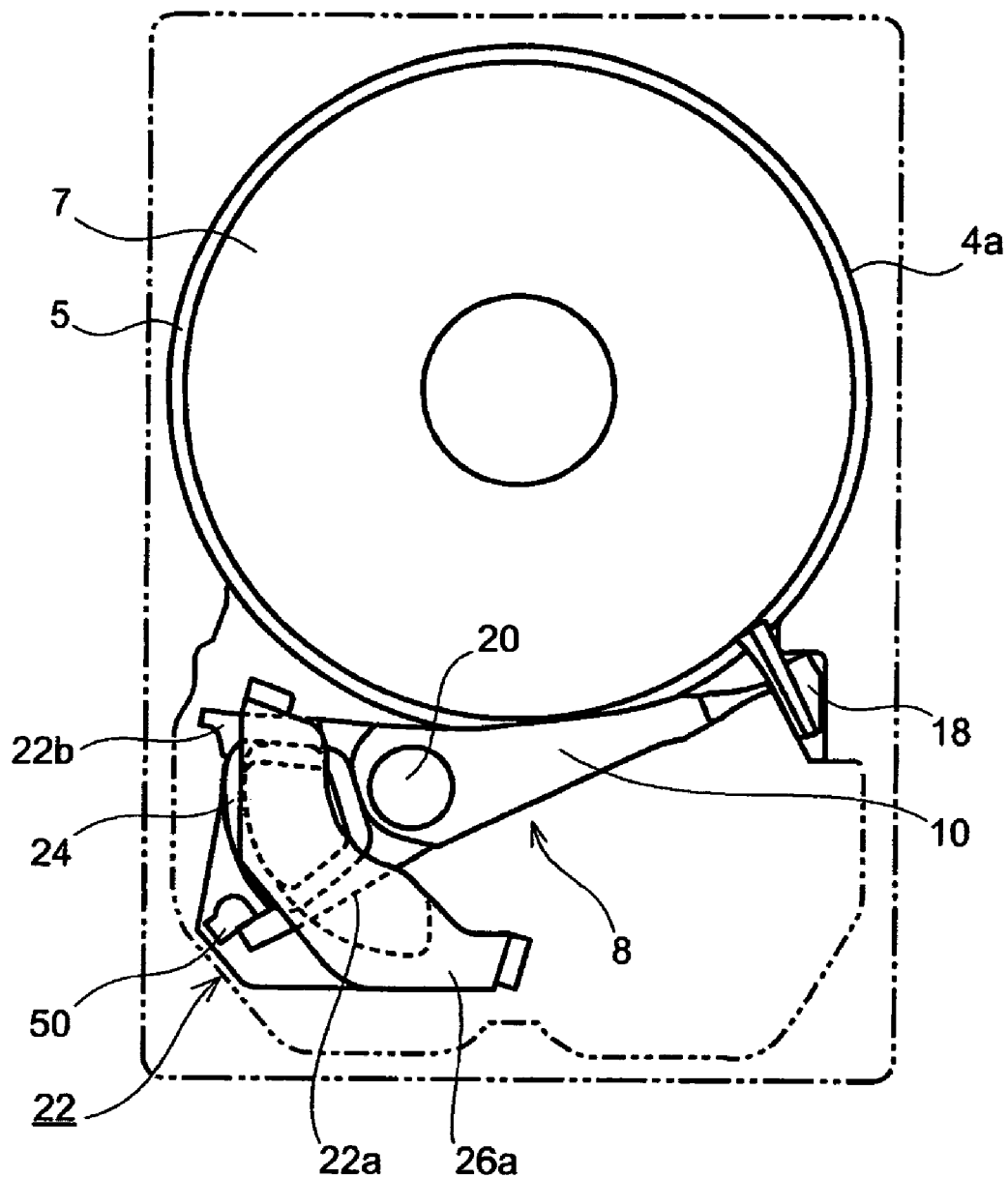
FIG. 4 is a plan view showing a schematic construction of the magnetic disk device illustrated in FIGS. 2(a)-(b).

Rotary disk storage devices according to specific embodiments of the present invention will be described hereinunder with reference to the accompanying drawings. FIGS. 1(a)-(d) include partial detailed diagrams illustrating a principal portion of a magnetic disk device 30 according to a first embodiment of the present invention, with an upper yoke 26a removed, in which FIGS. 1(a)-(b) illustrate an actuator assembly 8 which has pivoted to an outer side and FIGS. 1(c)-(d) illustrate the actuator assembly 8 which has pivoted to an inner side. FIGS. 2(a)-(b) are perspective views showing a schematic construction of the magnetic disk device 30 as seen in two directions. FIG. 3 is a schematic sectional view of a principal portion taken on line A-A in FIG. 2(a). FIG. 4 is a plan view showing a state of the actuator assembly 8 positioned in a ramp 18 as a retracted position.

In, for example, a magnetic disk device as a rotary disk storage device according to a specific embodiment of the present invention, as shown in FIGS. 2(a), 3, and 4, two magnetic disks 4a and 4b as rotary disk recording media, as well as an actuator assembly 8 with sliders 14*a*, 14*b*, 14*c*, 14*d* and suspension assemblies 12*a*, 12*b*, 12*c*, 12*d* attached thereto, are accommodated within a hermetically sealed space of a clean atmosphere which is defined by both a housing 2 and a housing lid (not shown) for covering the housing 2 from above. Further, a logic card (not shown) for controlling the operation of the magnetic disk device 30 and for controlling data read and write is attached to the outside of a bottom of the housing 2.

A magnetic layer for holding data as a change of magnetic domain is formed on an aluminum substrate of each of the magnetic disks 4*a* and 4*b* by a sputtering process together with various layers used for the improvement of adhesion and magnetic characteristics and for surface protection. Each of the disks 4*a* and 4*b* is provided on each of its surface and back side with a data area 7 for recording data which area 7 occupies the greater central part of the disk, and a non-data area 5 not used for recording data which area 5 is formed annularly in the vicinity of the outside diameter of the data area. The two magnetic disks 4*a* and 4*b* are disposed to be spaced from one another vertically in parallel and are screwed to a rotor portion of a spindle motor (not shown) installed in the housing 2. With the spindle motor, the magnetic disks 4*a* and 4*b* are rotated about a spindle shaft 6.

Magnetic heads (not shown) for reading data from the magnetic disks 4*a* and 4*b* are attached to the respective tips of the sliders 14*a*, 14*b*, 14*c*, and 14*d*. Four such magnetic heads are provided correspondingly to the surfaces and the back sides of the magnetic disks 4*a* and 4*b*, and four sliders 14*a*, 14*b*, 14*c*, and 14*d* are provided for mounting the four magnetic heads. The magnetic heads make a two-way conversion of an electric signal and a magnetic signal and can read and write data between them and the magnetic disks 4*a* and 4*b*. The magnetic heads may be constituted by only reading magnetic heads which read recorded magnetic signals and convert them into electric signals and thereby reproduce information. The sliders 14*a* to 14*d* have air bearing surfaces (ABS) formed on respective bottoms. Air currents generated on the surfaces of the magnetic disks 4*a* and 4*b* which are rotating strike against the air bearing surfaces of the sliders 14*a* to 14*d*, whereby the sliders are given buoyancy, so as to fly while maintaining a slight gap from the surfaces of the magnetic disk surfaces and are placed at their respective predetermined positions.

Tabs 16*a*, 16*b*, 16*c*, and 16*d* are projected from tips of the suspension assemblies 12*a*, 12*b*, 12*c*, and 12*d*, respectively, and are held in a ramp 18 which is mounted to the housing 2 at a position outside and close to the magnetic disks 4*a* and 4*b*. The ramp 18 is a component adopted in the load/unload method which is a technique for providing the sliders with a retraction place when stopping the operation of the magnetic disks 4*a* and 4*b*. For example, the ramp 18 is disclosed in Japanese Patent Laid-open No. 10-302421.

The actuator assembly 8 is provided with a carriage arm 10 which is pivotable about a pivot shaft 20 supported upright from the bottom of the housing 2. At a rear portion of the carriage arm 10 is formed a coil support 22 which is integrally formed in a bifurcated shape by both first arm 22*a* and second arm 22*b*. The coil support 22 supports a voice coil 24 (see FIG. 4). Voice coil magnets 28*a* and 28*b*, which are constituted by permanent magnets, are attached to an upper yoke 26*a* and a lower yoke 26*b*, respectively, to define a magnetic field space, in which is disposed the voice coil 24 (see FIG. 3).

The coil support 22, voice coil 24, voice coil magnets 28*a*, 28*b*, upper yoke 26*a*, and lower yoke 26*b* constitute a voice coil motor. Thus, a rotational force can be imparted to the voice coil by a magnetic field. Even if it is on the inside of only one yoke that a permanent magnet is present, it is possible to constitute the voice coil motor.

The lower yoke 26*b* is mounted on the housing 2 and for example three support rods 261 (see FIGS. 1(*a*)-(*d*)) for supporting the upper yoke 26*a* are provided at end portions of the lower yoke 26*b*, with the voice coil motor 24 being disposed between the upper yoke 26*a* and the lower yoke 26*b*.

An electric current for turning the actuator assembly 8 flows in the voice coil motor 24 held by the coil support 22. The logic card controls the magnitude and direction of the electric current flowing in the voice coil motor, whereby it is possible to drive the actuator assembly 8 and place the sliders 14*a*, 14*b*, 14*c*, and 14*d* into their respective predetermined positions.

In FIGS. 2(*a*)-(*b*), when the voice coil magnets 28*a* and 28*b* are seen from above in a plan view, the upper voice coil magnet 28*a* attached to the underside of the upper yoke 26*a* has an N-pole on the left-hand side and an S-pole on the right-hand side (see FIGS. 2(*a*)-(*b*)). The lower voice coil magnet 28*b* opposed to the upper voice coil magnet 28*a* has left and right magnetic poles of opposite polarities to those of the magnetic poles of the magnet 28*a*. That is, the voice coil magnets 28*a* and 28*b* are disposed in such a manner that, when an electric current is allowed to flow in the voice coil 24, a magnetic field created by the voice coil magnets 28*a* and 28*b* can impart an effective force to the voice coil 24 through the upper and lower yokes 26*a*, 26*b*.

When the operation of the magnetic disk device 30 is to be stopped, the actuator assembly 8 is moved up to outside the magnetic disks 4*a* and 4*b* prior to stopping the rotation of the magnetic disks 4*a* and 4*b*; further, the sliders 14*a*, 14*b*, 14*c*, and 14*d* are retracted to the ramp position while allowing the tabs 16*a*, 16*b*, 16*c*, and 16*d* to slide in the ramp 18.

When the actuator assembly 8 turns to a predetermined position and reaches the retracting position in the ramp 18, the four sliders 14*a*, 14*b*, 14*c*, and 14*d* are held so as to maintain a certain spacing between adjacent sliders to prevent mutual contact even when an impact force that accelerates the sliders vertically is applied to the magnetic disk device 30.

To restrict an excessive movement of the actuator assembly 8 to the inner or the outer side, a stopper 50 is disposed inside the first arm 22*a* and the second arm 22*b* of the bifurcated coil support 22 in the actuator assembly 8.

In the stopper 50, rubber 51 as an elastic member is cantilevered by a support rod so as to undergo a moment of force and absorb a shock for the purpose of restricting an excessive movement of the actuator assembly 8 to the inner or the outer side upon abutment against the first arm 22*a* or the second arm 22*b* of the coil support 22. The support rod is disposed outside a turning track of turning ends of the first and second arms 22*a* and 22*b* of the coil support 22. For example, by using the middle support rod 261 out of the three support rods 261 provided on the lower yoke 26*b*, the support rod can be disposed inside the first and second arms 22*a*, 22*b* of the coil support 22. Further, if the middle support rod 261 is disposed outside a horizontal projection plane of the upper yoke 26*a*, it can be positioned outside a turning track of turning ends of the first and second arms 22*a*, 22*b* of the coil support 22. Thus, since the support rod 261 provided on the lower yoke 26*b* is used, it is not necessary to separately provide any member for securing the rubber 51 of the stopper 50, the support rod may be disposed in such a position of the housing 2.

Fluorine-contained rubber having a hardness of, e.g., about 78 is used as the rubber 51 of the stopper 50. The portion of the rubber 51 against which the first arm 22*a* of the coil support 22 comes into abutment with rotation of the actuator assembly 8 to the outer side is formed in a shape having a shock absorbing property that prevents rebounding of the first arm 22a upon the abutment. On the other hand, the portion of the rubber 51 against which the second arm 22b of the coil support 22 comes into abutment with rotation of the actuator assembly 8 to the inner side is formed in a shape having a shock absorbing property that permits the second arm 22b to stop substantially in a reference position upon the abutment. The hardness of the rubber 51 is not limited to the aforesaid hardness.

FIGS. 5(a)-(b) includes explanatory diagrams illustrating the shape of the rubber 51 concretely and a state in which the stopper 50 is mounted to the lower yoke 26b. As shown in FIG. 5(a), the rubber 51 comprises a rectangular parallelepiped portion 51a and a convex portion 51b formed on one side of the rectangular parallelepiped portion 51a. The convex portion 51b is generally U-shaped, but when seen from above in a plan view manner in FIG. 1, it assumes an L-shape. An insertion hole 51c for insertion therein of a support rod 261 is bored in the rectangular parallelepiped portion 51a at a position where the convex portion 51b is not present, and the rubber having such a shape is fitted on the support rod 261, whereby the stopper 50 can be cantilevered.

The rubber 51, when fitted on the support rod 261, comes into pressure contact with the support rod 261. Accordingly, the insertion hole 51c of the rubber 51 expands when the rubber 51 is fitted on the support rod, so that the fitting performance of the rubber is improved and it is possible to prevent dislodgment thereof.

A permanent magnet 52 as a magnet material is embedded in the rectangular parallelepiped portion 51a at a position near a side of the rectangular parallelepiped portion which side is opposite to the convex portion 51b. The permanent magnet 52 attracts the first and second arms 22a, 22b of the coil support 22. By embedding the permanent magnet 52 in the rubber 51, the first and second arms 22a, 22b of the coil support 22 can be kept fixed upon unloading with the power turned on.

An insertion hole 51d is formed in a bottom region of the convex portion 51b of the rubber 51 of the stopper 50, and a swivel stop 262 fitted in the insertion hole 51d is provided on the lower yoke 26b. Thus, when the first and second arms 22a, 22b of the coil support 22 come into abutment against the stopper 50, it is possible to prevent rotation of the stopper 50 and dislocation of the abutted position which would cause a change in turning range of the actuator assembly 8. The position of the swivel stop is not limited to the above position, but the swivel stop may be provided at a position of abutment against an outer surface of the rubber 51 of the stopper 50, as shown in FIG. 5(b). Even in this case there can be obtained the same effect as above.

Thus, with a single stopper 50 in the load/unload method, it is possible to restrict an excessive movement of the actuator assembly 8 to the inner or the outer side.

The operation of the magnetic disk device 30 constructed as above will be described below.

With the operation being at rest, the tabs 16a, 16b, 16c, and 16d of the suspension assemblies 12a, 12b, 12c, and 12d are placed in the retracting position of the ramp 18 and the first arm 22a of the coil support 22 of the actuator assembly 8 is in abutment against the stopper 50 (see FIG. 1(a)). In this state, if the magnetic disk device 30 is started up, the spindle motor is turned on to rotate the magnetic disks 4a and 4b. Therefore, if the voice coil 24 is driven to rotate the actuator assembly 8 toward the magnetic disks, the tabs 16a, 16b, 16c, and 16d move away from the ramp 18 while sliding on a slide surface of the ramp 18. The sliders 14a, 14b, 14c, and 14d move to the surfaces of the magnetic disks and an air current created with rotation of the magnetic disks flow into the respective spaces between the magnetic disks 4a, 4b and the sliders 14a, 14b, 14c, 14d to form air bearings, so that the sliders float by utilizing the air bearings.

Upon abutment of the second arm 22b of the coil support 22 against the stopper 50, the magnetic heads attached to the sliders 14a, 14b, 14c, and 14d move from the retracted positions of the magnetic disks 4a and 4b to the reference position (see FIG. 1(c)).

To stop the operation, the voice coil 24 is driven to rotate the actuator assembly 8 toward the ramp until it reaches the retracting position in the ramp 18. In this state, the first arm 22a of the coil support 22 is put in abutment against the stopper 50.

In the magnetic disk device 30, if the sliders 14a, 14b, 14c, and 14d with the magnetic heads attached thereto are moved rapidly to the position of the ramp 18 when it has become impossible to read the tracks on the magnetic disks 4a and 4b during writing or reading of magnetic signals, or if the sliders are moved up to the position of the ramp 18 by utilizing a counter-electromotive force of the magnetic disks 4a and 4b upon sudden cut-off of the power supply, the first arm 22a of the coil support 22 in the actuator assembly 8 may strike against the stopper 50. In this case, the first arm 22a strikes against one side of the rectangular parallelepiped portion 51a of the rubber 51 of the stopper 50, so that the rubber 51 tends to rotate about the support rod 261, but the rotation of the rubber 51 is prevented by the swivel stop 262. The insertion length of the swivel stop 262 is set to a length shorter than the thickness of the rubber 51 and the position of abutment of the first arm 22a against the rubber 51 is higher than the position where the swivel stop 262 is inserted into the rubber 51; besides, the rubber 51 itself is cantilevered by the support rod 261. Therefore, the rubber 51 deflects when it undergoes a bending moment or a shear moment and hence can absorb the resultant shock. As a result, it is possible to prevent rebounding of the first arm 22a of the coil support 22. Further, since the permanent magnet 52 is embedded in the rubber 51, the first arm 22a whose shock has been absorbed by the rubber 51 can be attracted to the stopper 50. In addition, when the power supply is turned off, it is possible to hold the first arm 22a on the ramp 18. If there is provided a latch for holding the coil support securely, the permanent magnet 52 is used as an auxiliary magnet.

On the other hand, the actuator assembly 8 may rotate toward the magnetic disks and the second arm 22b of the coil support 22 comes into abutment against the stopper 50. In this case, it comes into abutment against the tip of the convex portion 51b of the rubber 51 in the stopper 50 against which the second arm 22b comes into abutment, whereby the resulting shock is absorbed. The convex portion 51b is higher in rigidity than the rectangular parallelepiped portion 51a and therefore the magnetic head can be utilized as a reference position for determining a writing position of the magnetic disks 4a and 4b.

To assemble the magnetic disk device 30, a spindle motor is installed into the interior of the housing 2 with the spindle shaft 6, etc., integral therewith, and the two magnetic disks 4a and 4b are screwed to a rotor portion of the spindle motor. Further, the lower yoke 26b with the voice coil magnet 28b attached thereto is mounted on the housing 2.

Next, a bearing portion of the carriage arm 10 is fitted on the pivot shaft 20. The carriage arm 10 is provided with the coil support 22 with the voice coil 24 fitted therein, the sliders 14a, 14b, 14c, and 14d with the magnetic heads attached thereto, and the suspension assemblies 12a, 12b, 12c, and 12d. Then, the carriage arm 10 is moved around the pivot shaft 20, causing the magnetic heads attached respectively to the sliders 14a, 14b, 14c, and 14d to move to between the magnetic disks 4a and 4b. A magnetic head-side end portion of FPC cable (not shown) is attached to a side face of the actuator assembly 8. In addition, head wires from the magnetic heads and a coil wire from the voice coil 24 are connected to the magnetic head-side end portion. An opposite end portion of the FPC cable is connected to a controller (not shown) through a connector.

Next, the upper yoke 26a with the voice coil magnet 28a attached thereto is placed at a predetermined position above the lower yoke 26b and is fixed to the space above the lower yoke 26b.

Thus, after the mounting of the magnetic disks 4a, 4b and the actuator assembly 8, the insertion hole 51c formed in the rubber 51 of the stopper 50 is fitted on the middle support rod 261 out of the support rods provided on the lower yoke 26b. With only such a simple operation, the stopper 50 can be installed. Thereafter, the housing lid of the housing 2 is mounted to complete the assembly.

Once the stopper 50 is installed, it becomes impossible to draw out the sliders 14a, 14b, 14c, and 14d with the magnetic heads attached thereto from between the magnetic disks 4a and 4b. However, if there arises the necessity of removing the stopper 50 due to, for example, repairing work for the magnetic heads, the stopper 50 can be removed easily by pulling out the rubber 51 from the support rod 261. Thus, the work for removing the actuator assembly 8, etc., can be done by merely removing the rubber 51 of the stopper 50 from the support rod 261, so that the device assembling work and maintenance work can be done separately from the stopper removing work.

Figure 6A:
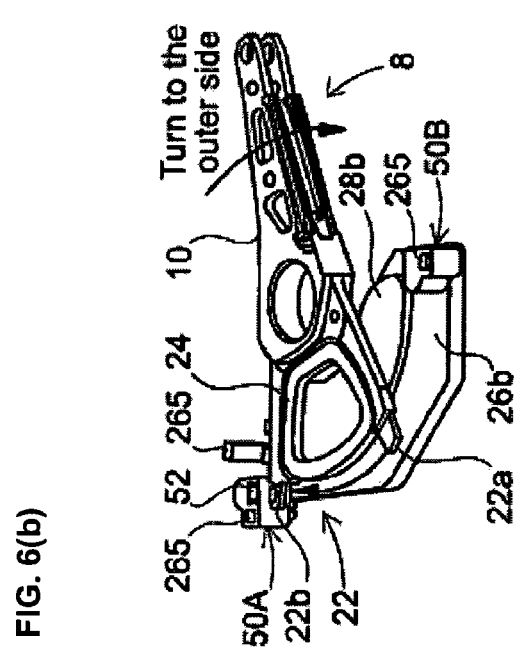
FIG. 6(a) is a partial detailed view of a rotary disk storage device according to another embodiment of the present invention, in a first position.
Figure 6B:
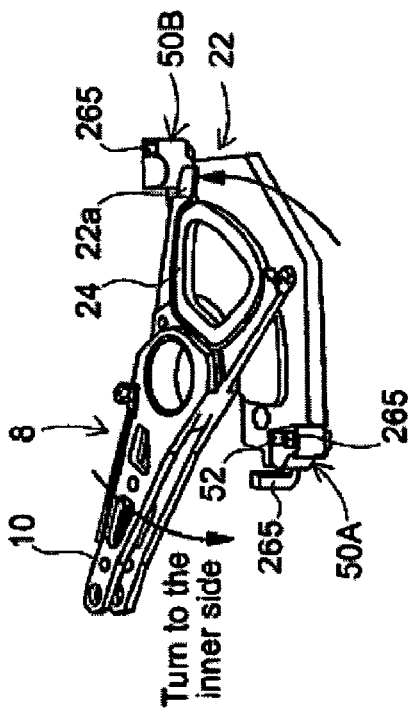
FIG. 6(b) is a perspective view of the embodiment in the same position as in FIG. 6(a).
Figure 6C:
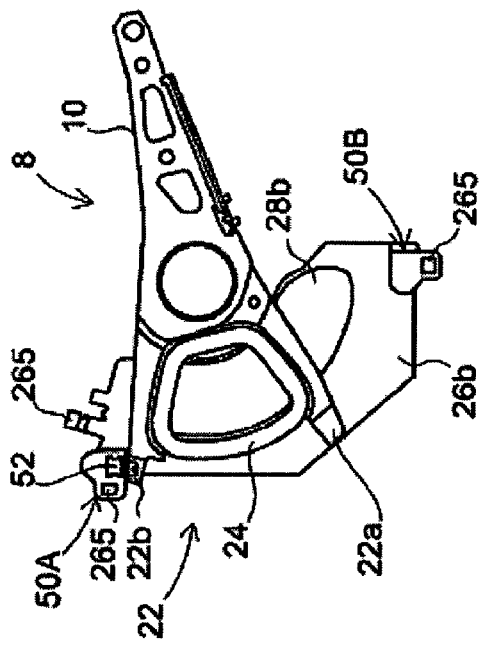
FIG. 6(c) is a top view of the same embodiment in a second position.
Figure 6D:
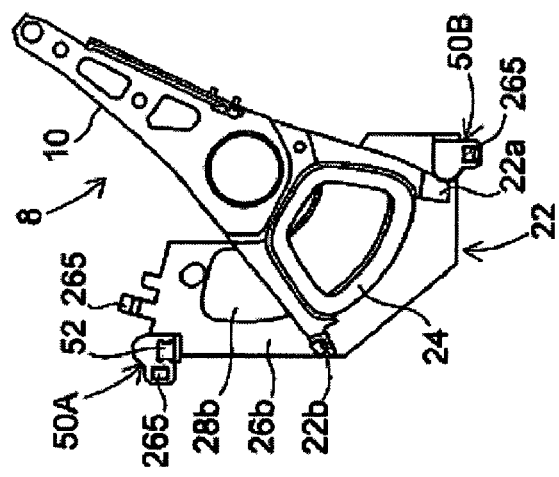
FIG. 6(d) is a perspective view of the embodiment in same position as in FIG. 6(c).

In the magnetic disk device 30 according to a specific embodiment of the present invention described above, the stopper 50 is disposed inside the first and second arms 22a, 22b of the bifurcated shape of the coil support 22 in the actuator assembly 8, but no limitation is made thereto. There may be adopted such a construction as shown in FIGS. 6(a) and 6(b) in which stoppers 50A and 50B are disposed at two positions outside the first and second arms 22a, 22b of the bifurcate shape of the coil support 22, one stopper 50A restricting an excessive movement of the actuator assembly 8 to the outer side and the other stopper 50B restricting an excessive movement of the actuator assembly 8 to the inner side. FIGS. 6(a)-(d) include partial detailed diagrams illustrating a principal portion of a magnetic disk device 30 according to another embodiment of the present invention, with an upper yoke 26a removed, in which FIGS. 6(a)-(b) illustrate an actuator assembly 8 having pivoted to the outer side and FIGS. 6(c)-(d) illustrate the actuator assembly 8 having pivoted to the inner side.

In this embodiment, out of plural support rods 265 projected on a lower yoke 26b, two support rods 265 positioned outside are disposed outside a horizontal projection plane of the upper yoke 26a and can thereby be positioned outside a turning track of turning ends of first and second arms 22a, 22b of a coil support 22. The other support rod than the two aforesaid two support rods 265 is positioned outside a pivotal range of the coil support 22.

If the stopper 50 described above is utilized, one stopper 50A for restricting an excessive movement of the actuator assembly 8 to the outer side is disposed such that the second arm 22b of the coil support 22 comes into abutment against one side of the rectangular parallelepiped portion 51a of the rubber 51 which has a shock absorbing property that prevents rebounding of the second arm 22b upon the abutment. On the other hand, the other stopper 50B for restricting an excessive movement of the actuator assembly 8 to the inner side is disposed such that the first arm 22a of the coil support 22 comes into abutment with the tip of the convex portion 51b of the rubber 51 which has a shock absorbing property that permits the first arm 22a to stop substantially at a reference position upon the abutment. Even if the stoppers 50A and 50B are thus disposed, their removing work is separate from the removing work of the actuator assembly 8, so that it is possible to effect the device assembling work and maintenance work in a simple manner. Moreover, a rotatable angle of the actuator assembly 8 can be adjusted by changing the respective projecting positions of the support rods 265 on the lower yoke 26b, and therefore design modifications can be made according to the size and application range of magnetic disks 4a and 4b.

Since the stopper 50B is used in such a manner that the first arm 22a comes into abutment against the tip of the convex portion 51b of the rubber 51, the permanent magnet 52 need not always be embedded in the rubber 51, as shown in FIGS. 6(a)-(d). The rubber 51 may be formed of a material having a shock absorbing property lower than that of the rubber 51 of the stopper 50A which permits the first arm 22 to stop substantially in the reference position upon abutment of the first arm against the stopper. A suitable shape thereof may be selected freely.

As shown in FIGS. 7(a) and 7(b), stoppers may be respectively disposed outside one of the first and second arms 22a, 22b of the bifurcated shape of the coil support 22 and inside the other arm, allowing one stopper 50A to restrict an excessive movement of the actuator assembly to the outer side and the other stopper 50B to restrict an excessive movement of the actuator assembly to the inner side. FIGS. 7(a)-(b) illustrate partially in detail a principal portion of a magnetic disk device 30 according to a further embodiment of the present invention, with an upper yoke 26a removed, in which FIG. 7(a) illustrates an actuator assembly 8 having turned to the outer side and FIG. 7(b) illustrates the actuator assembly 8 having turned to the inner side.

To obtain the same effect as in the case where stoppers are disposed at two positions outside the first and second arms 22a, 22b of the coil support 22, in FIGS. 7(a)-(b), the stopper 50A against which the second arm 22b having turned to the outer side comes into abutment is disposed in such a manner that the second arm 22b is abutted against one side of the rectangular parallelepiped portion 51a of the rubber 51 which has a shock absorbing property that prevents rebounding of the second arm upon the abutment. On the other hand, the stopper 50B against which the second arm 22b having turned to the inner side comes into abutment is disposed in such a manner that the second arm 22b is abutted against the tip of the convex portion 51b of the rubber 51 which has a shock-absorbing property that permits the second arm to stop substantially in the reference position upon the abutment.

Since the stopper 50B is used only for allowing the first arm 22a to come into abutment against the tip of the convex portion 51b of the rubber 51, the permanent magnet 52 need not always be embedded in the rubber 51, as shown in FIGS. 7(a)-(b). Alternatively the stopper may be constituted as a separate component having a shock absorbing property that permits the second arm 22b to stop substantially at the reference position when abutted against the stopper.

Figure 8:
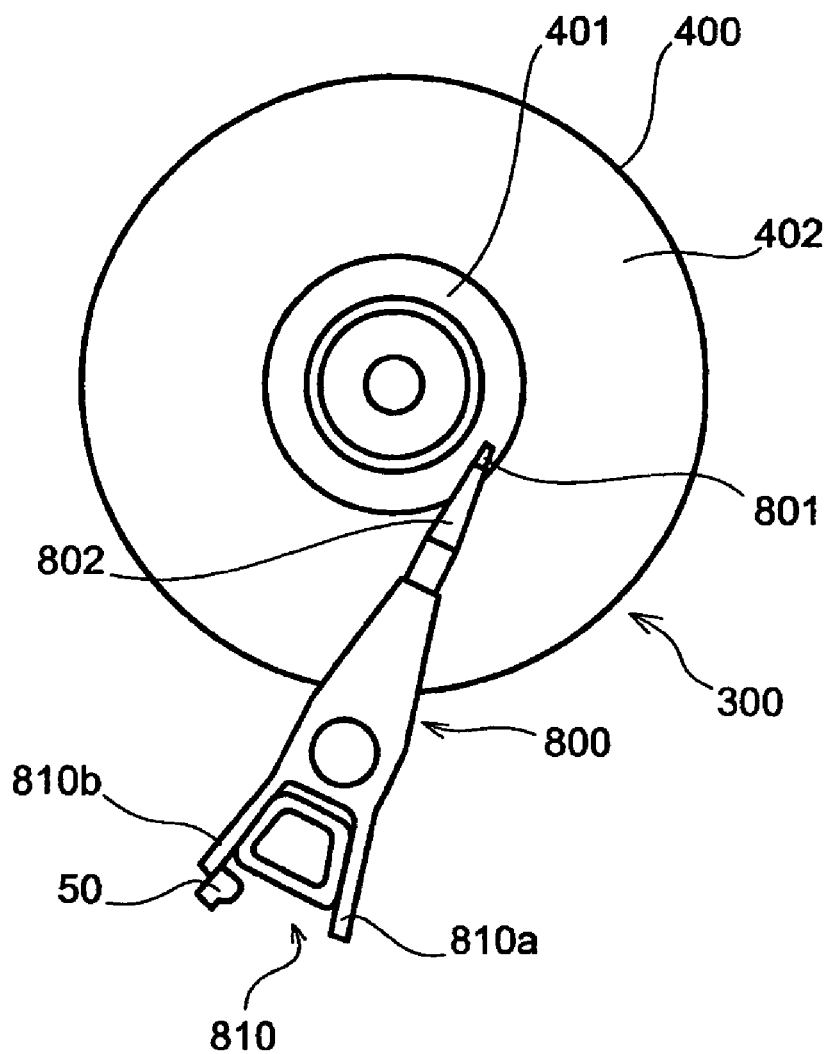
FIG. 8 is a schematic diagram of a rotary disk storage device according to a still further embodiment of the present invention.

Although in each of the above embodiments the stopper 50 is used in the magnetic disk device based on the load/unload method, no limitation is made thereto. As shown in FIG. 8, the stopper 50 is also employable in a magnetic disk device 300 based on CSS (Contact Start Stop) method in which a magnetic disk 400 has a retraction area 401 and an actuator assembly 800 causes a slider 801 with a magnetic head attached thereto to be retracted to the retraction area 401 through a suspension assembly 802. FIG. 8 illustrates a schematic construction of the magnetic disk device 300 according to a still further embodiment of the present invention.

In the magnetic disk 400 of the magnetic disk device based on the CSS method, the retraction area 401 is formed near an inner periphery of the magnetic disk 400, and a data area 402 is formed outside the retraction area 401. The retraction area 401 is an area having a concave/convex shape called texture on a surface of the magnetic disk 400 and functions as an area on which the slider 801 having lost the air bearing effect upon stop of rotation of the magnetic disk 400 lands or from which the slider 801 takes off upon rotation of the magnetic disk 400. The texture of the retraction area 401 performs a function of diminishing a frictional force when the slider 801 lands on or takes off from the magnetic disk 400 and also performs a function of preventing wear of the disk surface.

Also in such a magnetic disk device based on the CSS method it is possible to utilize the stopper 50, but when the actuator assembly 800 turns to the inner side, the slider 801 is retracted to the retraction area 401 of the magnetic disk 400, while upon rotation of the actuator assembly 800 to the outer side, the slider 801 moves to the reference position of the magnetic disk 400. Therefore, the stopper 50 may be disposed inside a first arm 810a and a second arm 810b of a bifurcated shape of a coil support 810. In this case, the stopper 50 is disposed in such manner that the first arm 810a of the coil support 810 comes into abutment against the tip of the convex portion 51b of the rubber 51 which has a shock absorbing property that permits the first arm 801a to stop substantially at the reference position upon the abutment and that the second arm 810b of the coil support 810 comes into abutment against one side of the rectangular parallelepiped portion 51a of the rubber 51 which has a shock absorbing property that prevents rebounding of the second arm, 81b upon the abutment. With this arrangement, it is possible to prevent rebounding of the second arm 810b of the coil support 810 and also possible to let the first arm 810a of the coil support 810 stop at the abutted position so as not to become offset from the reference position of the magnetic disk 400.

There may be adopted a construction wherein stoppers 50 are disposed at two positions outside the first and second arms 810a, 810b of the bifurcated shape of the coil support 810, allowing one stopper to restrict an excessive movement of the actuator assembly 800 to the outer side and the other stopper to restrict an excessive movement of the actuator assembly to the inner side.

In this case, one stopper 50 for restricting an excessive movement of the actuator assembly 800 to the outer side is disposed in such a manner that the first arm 810a of the coil support 810 comes into abutment against the tip of the convex portion 51b of the rubber 51 which has a shock absorbing property that permits the first arm to stop substantially at the same position upon the abutment and that the second arm 810b comes into abutment against one side of the rectangular parallelepiped portion 51a of the rubber 51 which has a shock absorbing property that prevents rebounding of the second arm 81b upon abutment.

Even if two such stoppers are disposed, their removing work is separate from the removing work for the actuator assembly 800, so that it is possible to carry out the device assembling work and maintenance work in a simple manner.

There also may be adopted another construction as follows. Stoppers 50 are respectively disposed outside one of the first and second arms 810a, 810b of the bifurcated shape of the coil support 810 and inside the first and second arms 810a, 810b, allowing one stopper 50 to restrict an excessive movement of the actuator assembly 800 to the outer side and the other stopper 50 to restrict an excessive movement of the actuator assembly to the inner side. In this case, to obtain the same effect as in the case where stoppers are disposed at two positions outside the first and second arms 810a, 810b of the coil support 810, for example, the stopper 50 against which the first arm 810a comes into abutment is disposed in such a manner that the first arm 810a is abutted against the tip of the convex portion 51b of the rubber 51 which has a shock absorbing property that permits the first arm 810a to stop substantially at the same position upon abutment. On the other hand, the stopper 50 against which the second arm 810b comes into abutment is disposed in such a manner that the second arm 810b is abutted against one side of the rectangular parallelepiped portion 51a of the rubber 51 which has a shock absorbing property that prevents rebounding of the second arm 810b upon the abutment.

Further, in each of the above embodiments, the rubber 51 of the stopper 50 comprises the rectangular parallelepiped portion 51a and the convex portion 51b formed at part of one side of the rectangular parallelepiped portion 51a, but no limitation is made thereto. As regards the shape of the rubber 51, any other shape is employable insofar as one portion of the stopper rubber is formed in a shape having a shock absorbing property that prevents rebounding of the actuator assembly upon abutment of the actuator assembly against the stopper rubber and the other portion is formed in a shape having a shock absorbing property that permits the actuator assembly to stop substantially at the reference position upon abutment of the actuator assembly against the stopper rubber.

In contrast with the magnetic disk device of the present embodiments having such a stopper, the magnetic disk device disclosed in the above-referenced Japanese Patent Laid-open No. 9-55047 discloses a stopper which comprises a shaft and a cylindrical shock-absorbing rubber. The shaft is fixed to a base of the magnetic disk device and has an annular groove formed in an outer periphery surface thereof. The cylindrical shock-absorbing rubber is mounted onto the shaft so as to cover the annular groove. Therefore, in order for the stopper to deflect and absorb a shock upon abutment of the actuator assembly against the stopper, it is necessary to thin the cylindrical shock-absorbing rubber; in other words, it is impossible to embed a magnet in the rubber.

Although the present invention has been described above by way of specific embodiments thereof illustrated in the drawings, the present invention is not limited to those embodiments, but it goes without saying that any known construction may be adopted insofar as the effects of the present invention can be obtained.

As set forth above, since the rotary disk storage device of the present embodiments has a stopper wherein an elastic member is cantilevered by a support rod so as to undergo a moment of force and cushion an abutment shock, it is possible to prevent a rebounding phenomenon of the actuator assembly. Besides, since the support rod which cantilevers the elastic member is disposed outside the pivoting track of the pivotal end of the actuator assembly, the removing work for the actuator assembly, etc., can be done by a mere removal of the elastic member of the stopper from the support rod. Therefore, the device assembling work and maintenance work can be done separately from the stopper removing work.

What is claimed is:

1. A rotary disk storage device comprising:
 a housing;
 a rotary disk recording medium, said rotary disk recording medium having a data area and being rotatable about a spindle shaft supported by a bottom of said housing;

a slider to which a head is attached to read data from said rotary disk recording medium;

a suspension assembly to which said slider is attached;

an actuator assembly to which said suspension assembly is attached, said actuator assembly including a first arm and a second arm and being adapted to turn about a pivot shaft so that said head moves between said data area and a retraction area, said pivot shaft being supported by the bottom of said housing;

a stopper including an elastic member, said elastic member being cantilevered by a support rod and with a magnetic material embedded therein for attracting said actuator assembly, the elastic member configured to engage said first arm and said second arm; and a swivel stop abutted against an outer surface of said elastic member, said swivel stop being disposed in such a position as prevents rotation of the elastic member centered on a support point of said stopper;

wherein, when either said first arm or said second arm of said actuator assembly comes into abutment against said elastic member, the elastic member undergoes a moment of force so as to restrict an excessive movement of said actuator assembly to an inner or an outer side, and cushions said abutment.

2. The rotary disk storage device according to claim 1, wherein said retraction area is formed on said rotary disk recording medium, and said actuator assembly causes said slider to be retracted to said retraction area.

3. The rotary disk storage device according to claim 1, wherein a coil support of said actuator assembly is formed in a bifurcated shape, and said stopper is disposed inside said bifurcated shape.

4. The rotary disk storage device according to claim 3, wherein the portion of either the outer or the inner side of said elastic member of said stopper, against which said actuator assembly turns into abutment, is formed in a shape having a shock absorbing property that prevents rebounding of the actuator assembly upon abutment, while the portion of the other outer or inner side of said elastic member, against which said actuator assembly turns into abutment, is formed in a shape having a shock absorbing property that permits the actuator assembly to stop substantially in the same position upon abutment.

5. The rotary disk storage device according to claim 1, wherein said elastic member of said stopper, when fitted on said support rod, comes into pressure contact with the support rod.

6. The rotary disk storage device according to claim 1, further comprising a lower yoke and an upper yoke, with a voice coil motor being installed inside said lower and upper yokes to rotate said actuator assembly, said lower and upper yokes imparting a rotational force to said voice coil motor by virtue of a magnetic field, and wherein a rod projecting from said lower or said upper yoke is used as said support rod.

7. The rotary disk storage device according to claim 1, further comprising a swivel stop fitted in an insertion hole formed in said elastic member, said swivel stop being disposed in such a position as prevents rotation of the elastic member centered on a support point of said stopper.

8. A rotary disk storage device comprising:

a housing;

a rotary disk recording medium, said rotary disk recording medium having a data area and being rotatable about a spindle shaft supported by a bottom of said housing;

a slider to which a head is attached to read data from said rotary disk recording medium;

a suspension assembly to which said slider is attached;

an actuator assembly to which said suspension assembly is attached, said actuator assembly including a first arm and a second arm and being adapted to turn about a pivot shaft so that said head moves between said data area and a retraction area, said pivot shaft being supported by the bottom of said housing;

a stopper including an elastic member cantilevered by a support rod, the elastic member configured to engage said first arm and said second arm; and a swivel stop abutted against an outer surface of said elastic member, said swivel stop being disposed in such a position as prevents rotation of the elastic member centered on a support point of said stopper;

wherein, when either said first arm or said second arm of said actuator assembly comes into abutment against said elastic member, the elastic member undergoes a moment of force so as to restrict an excessive movement of said actuator assembly to an inner or an outer side, and cushions said abutment, and said support rod is disposed outside a turning track of a turning end of said actuator assembly.

9. The rotary disk storage device according to claim 8, wherein said retraction area is formed on said rotary disk recording medium, and said actuator assembly causes said slider to be retracted to said retraction area.

10. The rotary disk storage device according to claim 8, wherein a coil support of said actuator assembly is formed in a bifurcated shape, and said stopper is disposed inside said bifurcated shape.

11. The rotary disk storage device according to claim 10, wherein the portion of either the outer or the inner side of said elastic member of said stopper, against which said actuator assembly turns into abutment, is formed in a shape having a shock absorbing property that prevents rebounding of the actuator assembly upon abutment, while the portion of the other outer or inner side of said elastic member, against which said actuator assembly turns into abutment, is formed in a shape having a shock absorbing property that permits the actuator assembly to stop substantially in the same position upon abutment.

12. The rotary disk storage device according to claim 8, wherein said elastic member of said stopper, when fitted on said support rod, comes into pressure contact with the support rod.

13. The rotary disk storage device according to claim 8, further comprising a lower yoke and an upper yoke, with a voice coil motor being installed inside said lower and upper yokes to rotate said actuator assembly, said lower and upper yokes imparting a rotational force to said voice coil motor by virtue of a magnetic field, and wherein a rod projecting from said lower or said upper yoke is used as said support rod.

14. The rotary disk storage device according to claim 8, further comprising a swivel stop fitted in an insertion hole formed in said elastic member, said swivel stop being disposed in such a position as prevents rotation of the elastic member centered on a support point of said stopper.

* * * * *